United States Patent [19]

Cornuejols

[11] Patent Number: 5,051,770
[45] Date of Patent: Sep. 24, 1991

[54] IMAGE PROCESSING DEVICE FOR CONTROLLING THE TRANSFER FUNCTION OF AN OPTICAL SYSTEM

[75] Inventor: Georges Cornuejols, Garches, France

[73] Assignee: Scanera S.C., Garches, France

[21] Appl. No.: 515,348

[22] Filed: Apr. 30, 1990

Related U.S. Application Data

[63] Continuation of Ser. No. 105,305, filed as PCT FR87/00020 on Jan. 20, 1987, published as WO87/04530 on Jul. 30, 1987, abandoned.

[30] Foreign Application Priority Data

Jan. 20, 1986 [FR] France ............................ 86 00710
Feb. 4, 1986 [FR] France ............................ 86 01552
Sep. 26, 1986 [FR] France ............................ 86 13433

[51] Int. Cl.$^5$ ..................... G03B 7/091; G03B 7/28; G03B 17/20
[52] U.S. Cl. .................................. 354/432; 354/446; 354/474; 354/127.13; 354/219; 354/289.12; 354/412
[58] Field of Search ............... 354/429, 219, 432, 155, 354/227.1, 271.1, 455, 446, 474, 475, 127.13, 289.1, 289.2, 412

[56] References Cited

U.S. PATENT DOCUMENTS

| | | | |
|---|---|---|---|
| 3,007,388 | 11/1961 | Ogata et al. | 354/227.1 |
| 3,555,987 | 1/1971 | Browning | 354/227.1 |
| 3,724,349 | 4/1973 | Revy Von Belvard et al. | 354/227.1 |
| 4,047,187 | 9/1977 | Mashimo et al. | 354/402 |
| 4,054,890 | 10/1977 | Shimomura | 354/227.1 |
| 4,075,640 | 2/1978 | Ueda et al. | 354/432 X |
| 4,106,034 | 8/1978 | Mills | 354/432 |
| 4,162,831 | 7/1979 | Gold | 354/31 |
| 4,256,372 | 3/1981 | Yasukuni et al. | 354/227.1 X |
| 4,297,018 | 10/1981 | Murakami et al. | 354/227.1 |
| 4,303,322 | 12/1981 | Someya | 354/219 X |
| 4,451,704 | 5/1984 | Winkelman | 179/18 F |
| 4,473,288 | 9/1984 | Omodera et al. | 354/432 |
| 4,480,269 | 10/1984 | Yoshida et al. | 354/227.1 X |
| 4,483,601 | 11/1984 | Sekida et al. | 354/288 |
| 4,541,704 | 9/1985 | Freeman | 354/432 |
| 4,591,253 | 5/1986 | Hecker et al. | 354/227.1 |

FOREIGN PATENT DOCUMENTS

| | | |
|---|---|---|
| 0141012 | 5/1985 | European Pat. Off. . |
| 2012580 | 3/1970 | France . |
| 2285630 | 4/1976 | France . |
| 2351550 | 12/1977 | France . |
| 2376428 | 7/1978 | France . |
| 223923 | 2/1982 | Japan .......... 354/432 |
| 255320 | 11/1986 | Japan .......... 354/227.1 |
| 1270597 | 4/1972 | United Kingdom . |
| 2019628 | 10/1979 | United Kingdom . |

Primary Examiner—W. B. Perkey
Attorney, Agent, or Firm—Oblon, Spivak, McClelland, Maier & Neustadt

[57] ABSTRACT

An image processing device having at least an image sensor, a flat image transfer screen and a computer, characterized by a sensor (3) arranged as a first network of image points or pixels, an analysis device (6, 4) adapted to generate for each pixel of the sensor a signal representative of at least one parameter, and at least a flat screen (18, 20, 25) organized according to a network of image points or pixels in association with processing means (5, 9) intended to elaborate for each pixel of the screen a state control signal which is a function of the representative signals delivered by the analysis means, the sensor and the screen receiving images of same objects, these images being transmitted or reflected by the screen. The device is more particularly suited to be used in the photographic industry.

24 Claims, 3 Drawing Sheets

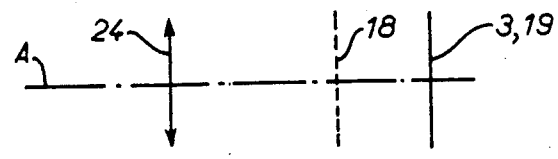
FIG. 6
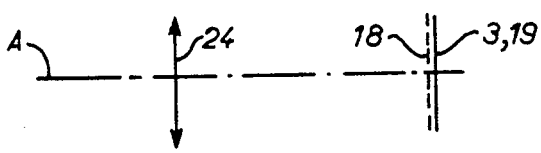
FIG. 7
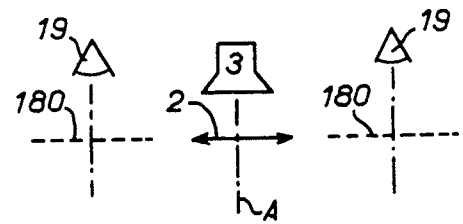
FIG. 8
FIG. 9
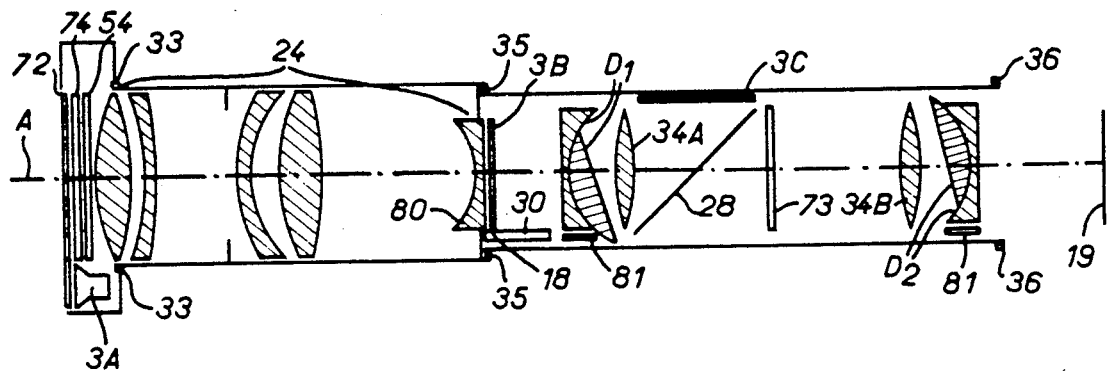
FIG. 10
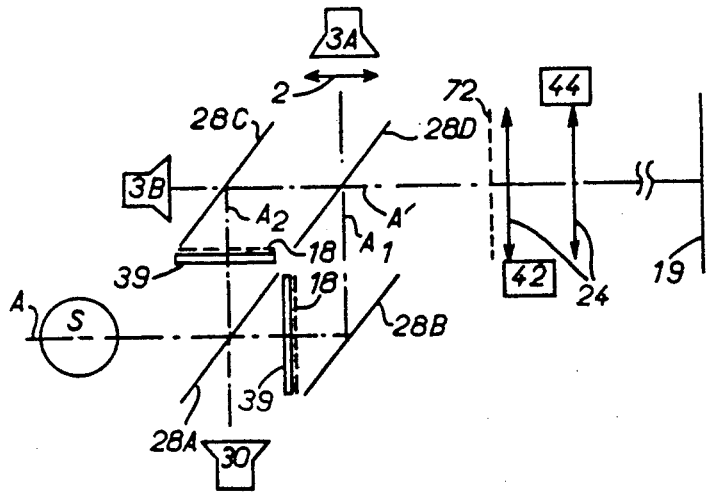
FIG. 11
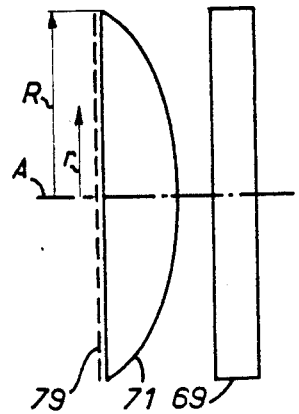

IMAGE PROCESSING DEVICE FOR CONTROLLING THE TRANSFER FUNCTION OF AN OPTICAL SYSTEM

This application is a continuation of application Ser. No. 105,305, filed as PCT FR87/00020 on Jan. 1987, published as WO87/04530 on Jul. 30, 1987, now abandoned.

The present invention concerns an image processing device for controlling the transfer function of an optical system and more particularly for controlling the exposure to light of a surface or of a sensor.

The optical system concept encompasses any apparatus for capturing, processing, transferring and reconstituting images.

There are currently known numerous and varied means for operating on the aforementioned transfer function, and mention may first be made of shutters consisting of mechanical components, of the curtain or blade type, which by moving in front of the surface to be illuminated allow light to pass for a determined time, the exposure parameters, duration, aperture and focusing distance being uniform over all of the surface of the image.

Electronic image capture apparatus with matrix type optical sensors, which do not have any shutter, also expose only with uniform parameters, except for the scanning speed in some cases, notably to image cylindrical objects.

Flat screen shutters such as that described in U.S. Pat. No. 4,297,018 with a printed circuit unit for cameras also expose only with uniform parameters.

The light addition device described in U.S. Pat. No. 4,541,704 merely provides additional illumination, after transfer of the image, on regions of a photo-sensitive surface that have been insufficiently exposed, but does not control any exposure parameter.

Currently known chromatic filters, of the gelatin or partially transparent plate type, are of a fixed nature and make no provision for fine adjustment of the filtering of the image.

Several manipulations of masks, which are also of a fixed nature, are needed to achieve image inlay.

All photo-sensitive surfaces and all optical sensors have a limitation on the ratio of the maximum and minimum illuminations that they can resolve without confusing them with black and white. This value is read from the sensitometry curve characteristic of the surface. The illumination of natural scenes or scenes lit for a short duration varies in space with a ratio of values which is much higher than this sensitometry ratio. Thus a uniform exposure does not make it possible to reconstitute the original scene.

Known contrast intensifiers such as that described in U.S. Pat. No. 3,724,349 do not enable control of all image capture parameters and merely adjust automatically the contrast of the original image with variable multiplication coefficients.

Certain photo-sensitive surfaces, including that of the eye, can be damaged by excessive light, even of short duration. The safety of persons in certain professions and/or of expensive equipment therefore depends on the currently non-existent facility to reduce selectively incident illumination above a threshold.

Currently known mechanical type iris diaphragms providing a variable aperture do not make it possible to implement multiple variable geometry mask functions in the plane of the diaphragm.

All optical devices have a finite depth of field. Uniform exposure in terms of focusing distance therefore introduces a limitation on the distance between the nearest and farthest points that can be perceived sharply. This limitation is made more severe as the aperture of the objective lens of the device is made wider.

Animated and projected images suffer from the same defects.

Image processing techniques make it possible to correct some of the aforementioned defects, but they are slow and difficult to execute. Also, some image processing techniques cannot be applied to chemical images.

There is no compressor-expander (compander) operative on the illumination of an image.

The object of the present invention is to create a device which remedies these defects.

To this end the invention proposes an image processing device comprising at least one image sensor, a flat image transfer screen and a computer, characterized by a sensor arranged as a first network of image points or pixels, analysis means adapted to generate for each pixel of the sensor a signal representative of at least one parameter, and at least one flat screen organized according to a network of image points or pixels in association with processing means intended to elaborate for each pixel of said screen a state control signal which is a function of the representative signals delivered by said analysis means, said sensor and said screen receiving images of same objects, these images being transmitted or reflected by said screen.

The comprehensiveness of this device resides in the fact that all the spatial, temporal and optical parameters of the transfer function of the optical system are controlled and more particularly in that each element or each region of an image may be exposed separately and independently of the other elements or regions, with its own specific exposure parameters.

In this device, one or more flat screens placed on the optical path of the light rays forming the image are slaved to one or more photo-sensitive sensors and/or to instructions given by a user and/or to an analog and/or digital computer. The device controls the exposure times and parameters of each point (pixel) or of each region of the image independently or otherwise of the other pixels or regions.

It has to be emphasized that this device functions in real time during the transfer of an image.

The principal functions of the device are to enhance or reduce luminous contrast, to modify the illumination and the color of elements of the image, to render them sharp or diffuse, to restore an image and to insert other images or text into the initial image.

The pinpoint or local instantaneous exposure parameters controlled by the device may include in particular the time at which exposure starts, the duration of exposure, the focusing distance, the aperture, the focal length, the exposure illumination transmitted and the color.

The uniform or overall exposure parameters controlled by the device may include in particular blur due to movement, blur due to focusing, polarization, sharp areas, contrast, filtering, depth of field, inlaying and/or superposition of other images and/or text, average illumination and darker or lighter regions, dominant color and more subdued or more lively colors, enlargement, compression-expansion ratio, masking and homogeneity of the aperture.

The present invention therefore finds numerous applications in all areas where lighting conditions have to be strictly controlled.

Medical imaging and some professions such as welding benefit from enhanced safety due to use of the present invention. Spatial images and images of explosive reactions are more refined. Some scenes that cannot be captured at present can be perceived and restored, image aging effects corrected, and so on.

In the artistic field, the creator can attenuate or strengthen locally or globally most of the previously mentioned technical constraints in order to obtain graphic or pictorial effects, in terms of both luminance and chrominance.

The device which is the subject matter of the invention may be inserted into a system for capturing, transferring, processing or reconstituting images, or more generally into any system comprising optical elements forming images such as cameras, telescopes, projectors, objective lenses, and so on.

Depending on its utilization, the device may therefore be regarded as a shutter, a filter, a mask, an automatic reproducer, a contrast enhancer, an editor or a compander, or as a non-stationary system for optical, spatial and digital processing of images.

The device in accordance with the invention makes it possible to process an image or the Fourier transform of the image or the transfer function of the device.

Masking may be adaptive or otherwise.

By reproducing the initial image on a flat screen in negative or positive form the device respectively reduces or enhances its contrast.

Functioning in real time, the device may be used on animated images.

Using the device to control multiple images makes it possible to create sequential dissolves and conventional as well as novel animation effects and to segment regions according to their shape, color, movement or, more generally, their luminous characteristics.

The editing, superposition and inlaying of scenes and texts may also be controlled.

The user may be replaced by an expert system.

The device also makes it possible to combine the qualities of fineness and definition of analog images, for example images on a chemical medium, and the qualities of flexibility, dynamism and modifiability of digital images.

The device advantageously makes it possible to eliminate mechanical components of currently known optical systems.

Other objects, advantages and characteristics of the invention will emerge from the following description given by way of example with reference to the appended drawings and describing by way of explanation only and in an entirely non-limiting way various embodiments and applications in accordance with the invention.

FIGS. 6 and 7 are schematics showing the relative position of the flat screen relative to a photo-sensitive surface coincident with a sensor.

FIG. 8 is a schematic showing one embodiment of the invention applied to protective goggles.

FIG. 9 is a schematic showing the application of the invention to the optics of an objective lens.

FIG. 10 is a schematic showing an application of the invention to a slide projector.

FIG. 11 shows an application of the invention to a variable focal length optical device.

Figure 1:
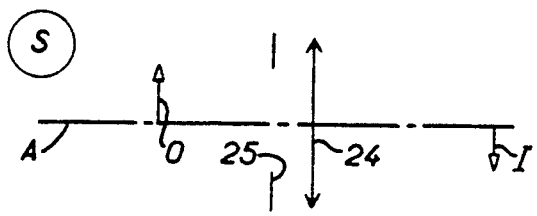
FIG. 1 is a schematic representation of an optical system.

Before undertaking a detailed description of the embodiments shown by way of example, it is necessary to explain a number of concepts.

The term light designates any electromagnetic type wave and in particular those whose wavelength is in or near the visible spectrum.

The term flat screen designates any device comprising a set of points for which any local and/or spatial and/or temporal optical factor, for example of emission, reflection, polarization, absorption, transmission or coherence, depends directly or indirectly on external factors or on external energy input such as electromagnetic fields, sound or light waves, electrical currents, or thermal, chemical, mechanical or biological factors.

For example, a flat screen may be a cathode ray tube TV, a liquid crystal display screen, a molecular electronic component containing rhodopsine, an electrophoretic system, a ferro-electric or PLZT (based on lead, lanthanum, zirconate, titanate) type ceramic, a flat screen made from conductive polymers, a set of optical fibers, an acousto-optical device and certain holograms.

It should be noted that the expression "flat screen" in reality encompasses any device of the kind defined hereinabove without the set of points that constitute it necessarily lying on a plane; this set of points may be located on a curved surface or even occupy a three-dimensional space.

The term photo-sensitive sensor encompasses any device comprising one or more fixed or movable components of which a physical characteristic varies according to the light that it receives or which emits a signal or energy conditioned by the incident light.

Photo-sensitive sensors include, for example, video cameras, charge-coupled device optical sensors, of the summing type or otherwise, photoresistors, phototransistors, photodiodes, amorphous transistors and, more generally, components having an opto-physical effect.

The term image denotes a field with a finite scalar support, in the mathematical sense, and more particularly any representation of a wave function. The term region of an image denotes any subset of the image.

The term contrast of a region of an image denotes the ratio of maximum and minimum scalar values, and more particularly of the illumination, luminance and chrominance, of the region of the image.

It has to be pointed out that the term "objective lens" encompasses lenses, magnifying glasses, relay lenses, field lenses, condensers and more generally any optical system intended to form or transfer an image.

The term computer denotes any device which applies (in the mathematical sense) a field of scalars into another; as scalar values are routinely represented by electrical signals, these will generally be devices using operational amplifiers and microprocessors.

The trade marks and references given in the description are provided only with a view to enhancing the understanding of the invention but are in no way to be seen as pre-conditioning the final choice of analog circuits or components for implementing these functions.

Unless otherwise indicated, in all the figures the light rays (not shown) travel from left to right and upwards after reflection.

FIG. 1 shows the essential components of an optical system. A light source S illuminates an object O; a diaphragm 25 and optics 24 form an image I of the object O on an optical axis A.

The characteristic elements of an optical system are thus the light source, the object, the optics and the image. In the various versions of the device to be described, the flat screen may comprise any one of these elements or a photo-sensitive sensor or may be inserted between any two of these elements.

Figure 2:
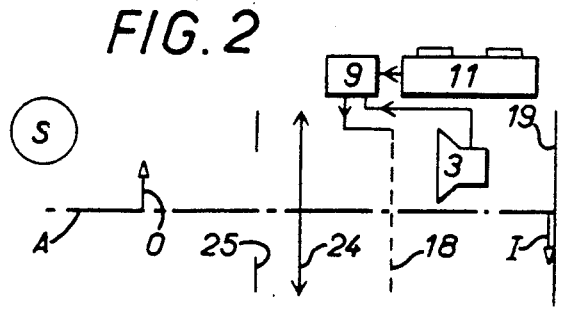
FIG. 2 is a schematic showing components which, in combination with a flat screen, constitute a device in accordance with the invention.

FIG. 2 shows, in addition to the previous components, a photo-sensitive sensor 3, a flat screen 18 associated with a computer 9, a keyboard 11 and a surface 19 on which is formed the image I of the object O. The respective positions of the diaphragm 25, the optics 24, the sensor 3 and the flat screen 18 on the optical path of the light rays may vary depending on the application, as will emerge from the examples to be described hereinafter.

The sensor 3 and the flat screen 18 are placed in such a way that they receive on their surface an image of the object O.

The sensor 3 is arranged as a first network of elements perceiving image elements or pixels.

The flat screen 18 is arranged as a second network of elements the transmittance or reflectance of which varies according to the signal transmitted to them.

The manufacture of such arrangements is a prior art technique.

It has to be pointed out that the term pixel covers both the image elements transmitted by the optical system and the elements of the sensor 3 and of the flat screen 18.

The computer 9 is adapted to process signals representative of at least one parameter of image elements perceived by each pixel of the sensor 3 and to supply a signal controlling the state of each pixel of the flat screen 18.

However, the networks and their numbers of elements may not be in optical correspondence and in particular may not be conjugate with the object O. The networks and the positions of these elements vary according to the optical parameters to be captured by the sensor 3 and according to the optical parameters to be processed by the flat screen 18.

Figure 3:
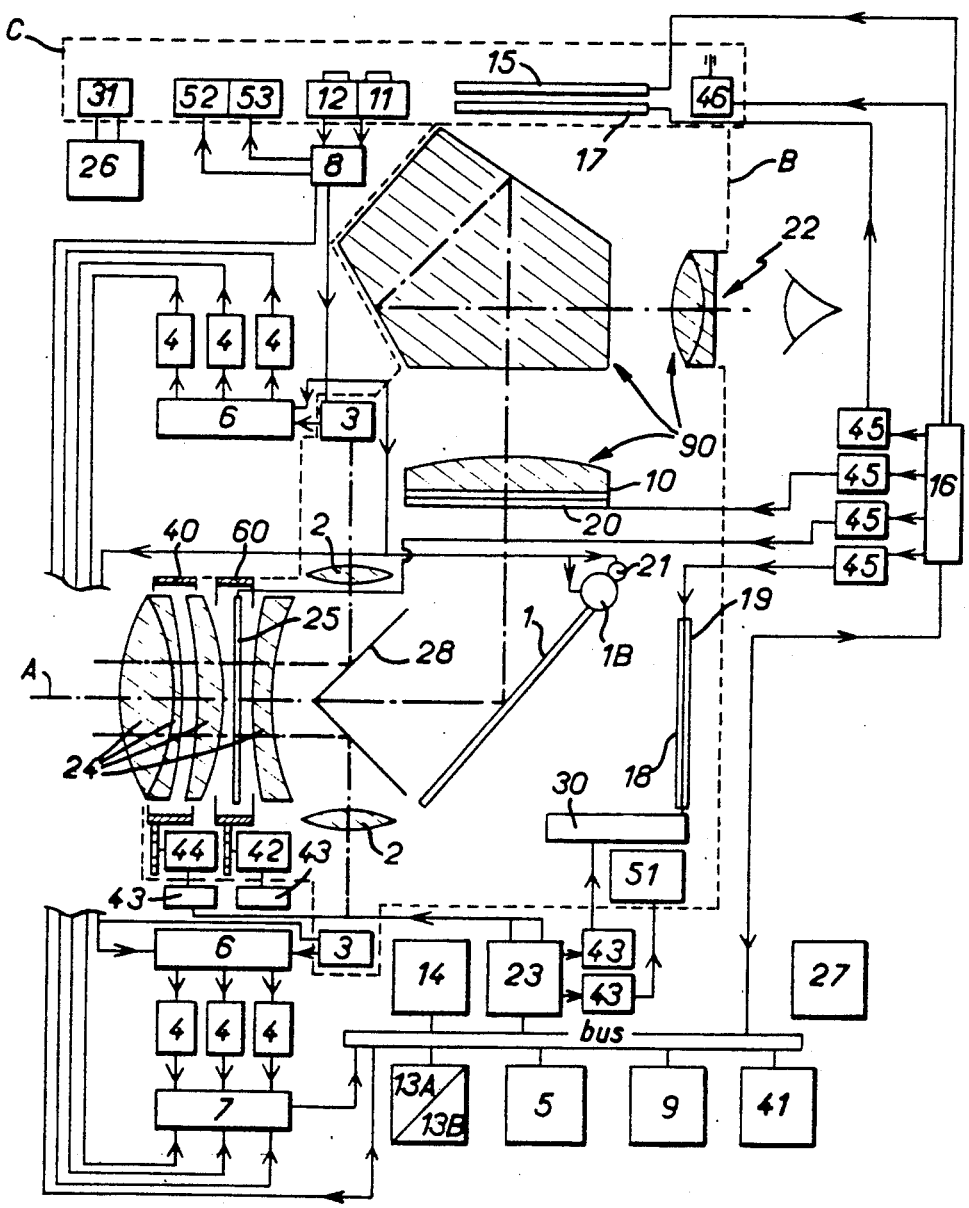
FIG. 3 is a schematic showing one embodiment of the invention as applied to a camera.
Figure 4:
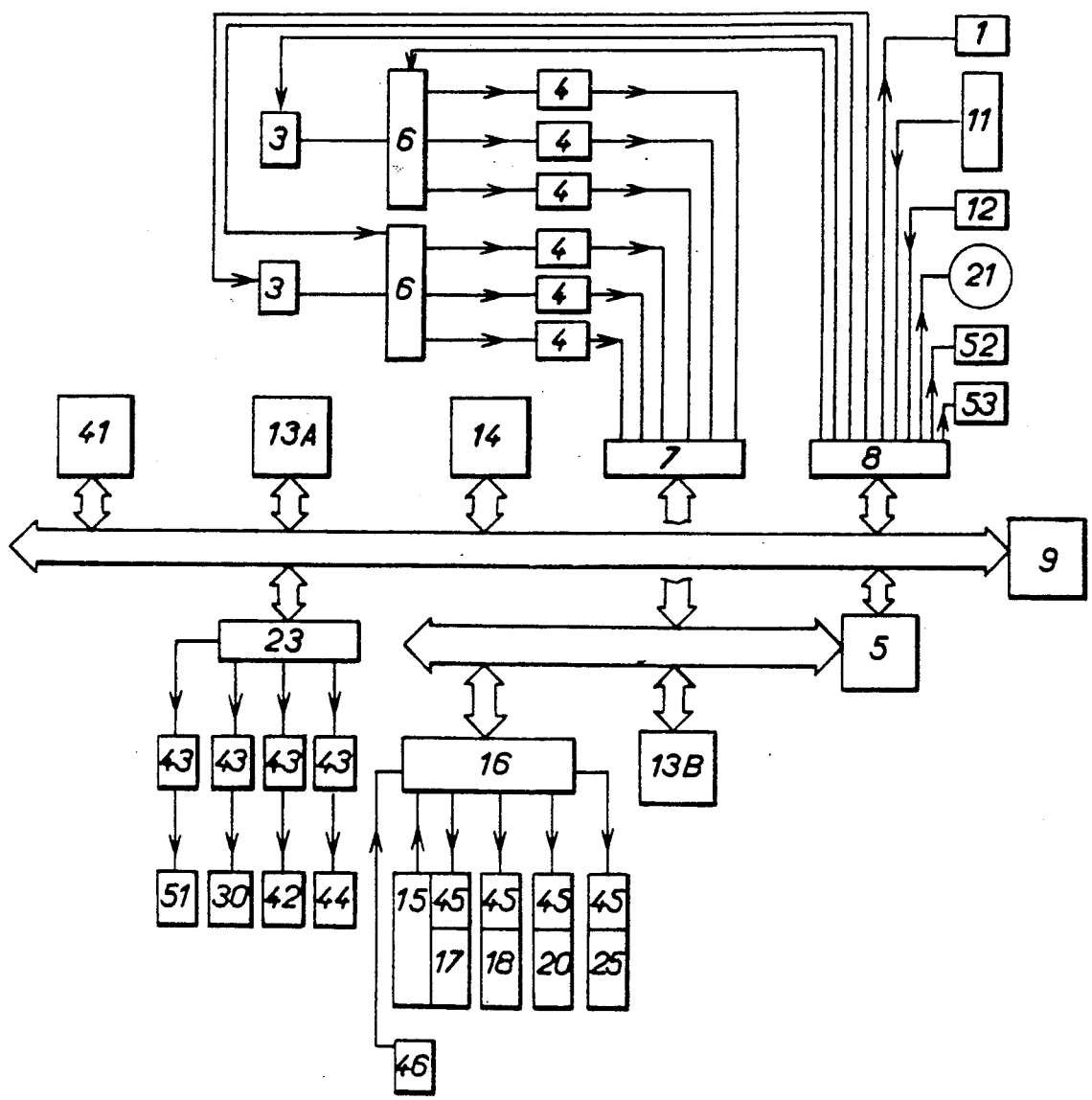
FIG. 4 is a schematic showing the interconnection of the components in the device shown in FIG. 3.
Figure 5:
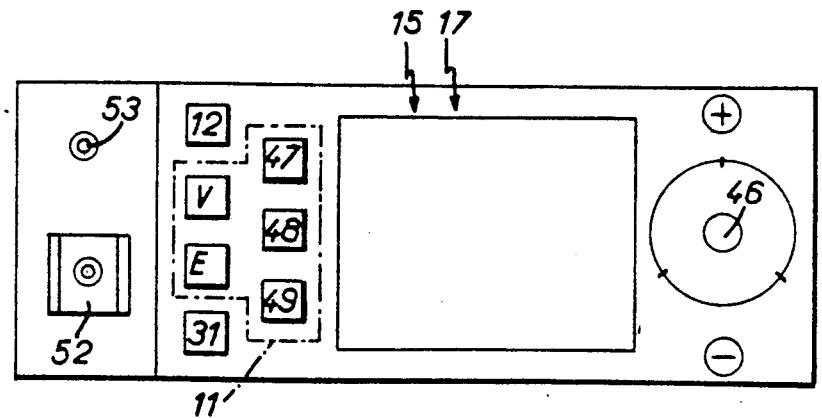
FIG. 5 shows a keyboard of the device shown in FIG. 3.

FIGS. 3 through 5 show the principal electronic components of this first embodiment, except for analog signal amplification circuits which are provided in the manner which is known in itself wherever needed.

FIG. 3 shows a device in accordance with the invention integrated into a known type single lens reflex camera.

A light-tight camera body B (shown in dashed outline in FIG. 3) comprises inside it an objective lens 24 of known type fitted with a focusing ring 40, a ring 60 for varying the focal length, a diaphragm 25 consisting of a transmissive passive flat screen, a two-sided semi-reflecting mirror 28, a movable mirror 1 comprising a displacement device 1B, a receptive surface 19, a frosted glass 10, a dioptric system 90 and a viewfinder 22.

The frosted glass 10 is usually coincident with the first dioptric element 90 of the reflex viewfinder optical system, the front face of which is frosted.

On respective sides of the two-sided mirror 28 are two lenses 2 respectively associated with two photo-sensitive sensors 3.

The camera body B further comprises the following transmissive passive flat screens: a flat screen 18 disposed in front of the responsive surface 19 and a flat screen 20 disposed in front of the frosted glass 10.

A light source 21 is adapted to illuminate the flat screens 18 and 20.

A motor 30 for moving the flat screen 18 along the optical axis, two motors 42 and 44 for rotating the rings 60 and 40, respectively, and a motor 51 for moving the photo-sensitive surface 19 longitudinally and laterally and in rotation are also integrated into the camera body B.

On an upper surface C of the camera body 20 are a shutter release button 12, a keyboard 11, a lever 46, a main switch 31, a reflective flat screen 17, a tactile screen 15, the flash hot shoe 52 and the flash synchronization socket 53 (see FIG. 5), all accessible to the user.

The electronics shown outside the camera body B and the surface C are in practise incorporated into an accessory unit (not shown) connected electrically by an electrical connector and mechanically by mechanical connections (not shown).

The accessory unit is placed against a bottom surface on the camera body B and comprises a control processor 9, an image processing processor 5, random access memories 13A, 13B, read only memory 14, a relay generator 41, and analysis and control means comprising the following interfaces:

The image input interface comprises control interfaces 6 connected to respective photo-sensitive sensors 3, analog-to-digital converters 4 and a direct memory access controller 7 connected to the processor 5.

The user instruction input interface comprises a parallel interface circuit 8 connected to the keyboard 11 and to the release button 12 and to the control processor 9 and a graphics screen controller 16 connected to the tactile screen 15 and to the lever 46 and to the processor 5.

The image output interface comprises the graphics screen controller 16 connected to the processor 5 and to circuits 45 for commanding and controlling the flat screens 17, 18, 20 and 25.

The command output interface comprises parallel interface circuits 8 and 23 connected to the control processor 9.

The parallel interface circuit 8 is also connected to the device 1B for moving the movable mirror 1, to the light source 21, to a flash hot shoe 52 and to a flash synchronization socket 53.

The parallel interface circuit 23 is connected to circuits 43 controlling stepper motors 30, 42, 44 and 51.

In this first embodiment of the device (FIG. 3) the flat screen 18 is near the surface 19 which is in this instance a photo-sensitive surface and on which an image I is formed during the exposure.

The photo-sensitive sensors 3 are of the charge-coupled device matrix optical sensor type, of the "FAIRCHILD" brand, for example.

The flat screens 18, 20 and 25 are of the following type:
 passive: meaning that they do not emit any light,
 transmissive, with active matrix: meaning that each point on the flat screen remains in the same state throughout the duration of the scan, and operating in color, such as "SEIKOSHA" brand liquid crystal graphics screens (full dot matrix LCD) employed in pocket TV receivers in particular.

The flat screen 17 is passive, reflective, with active matrix and operates in color.

When the mirror 1 is in the low position (FIG. 3) it reflects rays from the objective lens to the viewfinder 22. There then forms on the frosted glass 10 of the viewfinder an image which is similar to the image formed on the photo-sensitive surface 19 when the shutter is released and the dioptric elements 90 transmit the image I to the eye of a user. In the high position (not shown) the mirror 1 is shifted away from the optical path of the light rays which then form the image on the photo-sensitive surface 19.

The electronics are based on the bus of the control microprocessor 9 referred to as the computer bus. This bus is connected to random access memory 13A and read only memory 14, to a time-delay generator 41, to the image processing processor 5 and to respective command input and output peripheral devices.

The command input peripheral device comprises a keyboard 11, a release button 12, a main switch 31, a lever 46 of the type used in remote control devices, and a transparent tactile screen 15 covering a flat screen 17 (FIG. 5). These elements are accessible from the exterior of the casing of the image capture apparatus so that the user can control the functioning of the device manually. A graphics screen controller 16 transfers the information that it reads from the tactile screen 15 and from the lever 46 to the image bus 5 of the device. The keyboard 11 and the release button 12 are read by a parallel interface circuit 8 which is connected to the computer bus 9. A main switch 31 is placed on electrical conductors connecting an electrical power supply 26 to the device and controls the turning on and off of the device.

The command output peripheral device comprises a number of control mechanisms. A parallel interface circuit 23 and control circuits 43 control displacement of the focusing optics 40 and focal length variation optics 60, the motor 30 for moving the flat screen 18 longitudinally and the motor 51 for moving the photo-sensitive surface 19.

Control devices 44 for the focusing ring 40, 42 for the focal length ring 60 and 30 for the distance from the flat screen 18 to the photo-sensitive surface 19 are electric stepper motors controlled by the stepper motor control circuits 43.

The activation of the matrix optical sensor 3 and its control and output interface 4, the turning on of a light source 21, the electrical current carried by the contacts of the flash hot shoe 52 and the flash synchronization socket 53, and movement of the mirror 1 are controlled by the command processor 9 through the parallel interface circuit 8.

An information input peripheral device is adapted to capture an initial image and to feed it into the random access memory 13B of the device.

The two-sided semi-reflecting mirror 28 is placed between the objective lens and the mirror 1 and is centered on the optical axis A of the camera; it reflects part of the light that it receives towards optical lenses 2 which form on matrix optical sensors 3 images which are homothetic to that which will be received by the photo-sensitive surface 19 when the shutter is released. The light transmitted by this mirror 28 continues in a straight line towards the mirror 1.

The illumination received by the sensor 3 is converted into electrical charges which are split into red, green and blue signals by control interfaces 6 and then digitized by analog-to-digital converters 4. An output port 4 from the converters 4 is connected to a direct memory access controller 7 which places this digital information in the random access memory 13B of the device through the intermediary of the image processor bus 5 which is coincident in FIG. 3 with the control processor bus 9.

A calculation and display peripheral device is based on the bus of the image processing processor 5. This bus, referred to as the image bus, functions in real time and carries, among other things, the images issued by the information input peripheral device and the images stored in the random access memory 13B. After processing by the dedicated processor 5, the data is transmitted by the peripheral device to the flat screens 17, 18, 20 and 25 from the microprocessor bus 5 through the intermediary of the video graphics screen controller 16 which controls the circuits 45 controlling the flat screens, said control circuits 45 comprising digital-to-analog converters. Among other things, the controller 16 implements demultiplexer, character generation and shift register functions. The negative (opaque when inoperative) flat screen 18 is placed in front of the responsive surface 19. The positive (transparent when inoperative) flat screen 20 is lit by transparency by the light source 21 and is placed in the reflex viewfinder 22, in contact with the frosted glass 10, between the latter and the reflex mirror 1. The flat screen 17 is on the top of the camera, just above the viewfinder. The flat screen 25 serves as a diaphragm and mask and is placed in a diaphragm plane of the objective lens 24.

The electrical power supply 26 supplies to each electronic component the energy it needs to function. Clocks 27 time the synchronized activity of the processor, the interfaces and the peripheral devices. However, to make FIGS. 3 through 5 easier to read the connections between the power supply 26 and the clocks 27, on the one hand, and the various system components, on the other hand, have not been symbolically represented, as they are known in themselves.

The processor 5 connected to the control processor bus 9 carries out various operations such as spatial convolutions, inversions, sums, multiplications, image processing and Fourier type transforms on the information matrixes representing the images contained in the random access memory 13B of the device.

The processor 9 controls the functioning of all the interfaces of the device according to the program placed in the read only memory 14 and instructions given by the user. These functions are described later in connection with the various operating modes of the device.

The processor 9 includes a so-called expert system program with an interference [sic]engine which processes the databases in the random access memories 13A and 13B using a knowledge base in the read only memory 14.

The time-delay generator 41 produces time-delays which serve to generate fixed state times for the pixels of the flat screens.

The random access memory 13B contains at least nine images, the images coded in red, green and blue for each of the sensors 3, a contrast image, a distance image and at least one of the instructions given by the user on the tactile screen 15.

The polarization axes of the polarizers of the flat screens 18, 20 and 25 are in corresponding relationship so as to pass maximum light towards the viewfinder and towards the photo-sensitive surface 19. To avoid influencing the transmission coefficient for polarized light coming from the sky in particular or from a reflection, the polarization axis of the front polarizer of the diaphragm screen 25 is inclined relative to the plane defined by the broken optical axis A. the front polarizers of the flat screens 18 and 20, receiving the light from the diaphragm 25, have the same polarization axis as the rear polarizer of the diaphragm 25, for minimum absorption.

FIG. 4 is a schematic showing the interconnection of the electronic and electromechanical components. The processor bus 5 (image bus) and the processor bus 9 (computer bus) are shown together with the peripheral devices and the interfaces.

The input port of each peripheral device component is connected to the output port of the component that precedes it in the path of data through these peripheral devices as described hereinabove.

FIG. 5 shows the top surface C of the camera body B comprising the flash synchronization socket 53, the flash hot shoe 52, the release button 12, the main switch 31, the lever 46, the tactile screen 15 superposed on the flat screen 17 and the keyboard 11 which comprises five keys. Three keys 47, 48 and 49 of the keyboard 11 face the transparent tactile screen 15 superposed on the flat screen 17 and are used to select the messages appearing on the flat screen 17.

As shown in FIG. 5, the messages that appear on the flat screen 17 are, for example, "speed priority", "aperture priority" and "program mode" and correspond to a choice of the automatic or the semiautomatic operating mode of the device and the camera (the messages may also appear in the viewfinder 22 on the flat screen 20).

The other two keys on the keyboard 11 respectively confirm (V) and cancel (E) the previous selection of one of the three keys 47, 48 and 49.

The tactile screen 15 is used for fingertip selection of the region or regions of the image (not shown) displayed by the screen 17, analogous to the image perceived by the sensors 3, on which an operation or process is to be conducted.

The keyboard 11 also comprises a lever 46 of the type used for remote control with two mutually perpendicular rotation axes which make it possible to select a color on the circle (FIG. 5) representing colors based on the three primary colors. An inclination axis of the lever designates a color mixed from the three primary colors. An inclination angle of the lever indicates an intensity of said color.

The lever 46 is also used to increase or reduce the value of a coefficient (not shown) displayed on the flat screen 17 by greater or lesser inclination towards "+" and "−" signs marked on the surface C.

The various operating modes of the device will now be described.

The read only memory 14 contains a program enabling operation as will now be described. All instruction given by the user are passed through the surface C shown in FIG. 5.

It has to be pointed out that the user may be another device or an expert system like that placed in the read only memory 14 of the device comprising an inference engine and a knowledge base.

By operating the main switch the user turns on all the electronic components and initializes the program. The processor 9 waits for an instruction, possibly an immediate shutter release instruction, before commanding continuous memorization of the image sensed by the sensor 3 and the image processed by the dedicated processor 5.

The user then composes his image and chooses an exposure mode. He can impose a shutter speed, an aperture and a focusing distance uniform over all of the photo-sensitive surface to be exposed in manual mode, the device then serving only as a conventional shutter.

The user may also require help with adjusting these uniform parameters. The device then measures the illumination received by the sensor 3 over all of the scene or separately in each part thereof. It displays a recommended shutter speed and aperture on the flat screen 20 in the viewfinder 22.

Semi-automatic speed priority and aperture priority modes and an automatic mode sometimes called a program mode function in the same way except that the device also adjusts the exposure parameters when the shutter is released.

For the operating modes described hereinabove, reference may usefully be had to those of many known cameras such as the "NIKON FM" and the "MINOLTA 7000".

If the user wishes to lighten or darken a region of the image he selects manually on the tactile screen 15 the region facing the region of the image then displayed on the flat screen 17. The user then specifies a positive or negative lightening coefficient. Inclining the lever 46 towards the "+" or "−" sign respectively increases or decreases the value of a coefficient displayed on the flat screen 17. The processor 9 instructs the graphics screen controller 16 to expose this region more or less intensely by respectively increasing or reducing the transmission coefficient for the pixels of the corresponding region of the flat screen 18 (monochromatic filtering).

Similarly, if the user wishes to modify the colors of a region of the image he selects this region and assigns to it a positive or negative coefficient or a color using the tactile screen 15 and the lever 46 in the same way as described hereinabove.

A negative coefficient corresponding to the opposite coefficient affecting the opposite color on the color circle, the processor 9 then instructs the processor 5 to multiply the original colors by the coefficient or to add the selected color in random access memory 13B and then, when the shutter is released, to display these colors on the region of the flat screen 18 corresponding to the selected region so that each pixel of this flat screen becomes a chromatic filter.

However the user may want to reduce or enhance the luminance contrast, when photographing a back-lit scene, for example.

The luminance contrast is reduced by varying the exposure times or the exposure apertures for each point by a respectively decreasing or increasing function of the illumination on each point. The contrast is enhanced by opposed monotonic functions. A strongly lit part of the image is exposed for a shorter time or with a higher aperture value or with a more opaque monochrome filter than a poorly lit part. By using the luminance matrix or the luminance inversion matrix computed by the processor 5 the processor 9 can control these localized differences during the exposure. The increase in aperture as a function of the incident luminous intensity or the decrease in exposure time as a function of this intensity is not necessarily linear, but may depend on the sensitometry curve of the surface to be exposed and on the luminance histogram.

An analogous chrominance contrast increase or reduction function is obtained by analyzing the chrominance histogram in an analogous way and by varying the polychrome filtering of the pixels of the flat screen 18.

The flexibility of the device results, as already explained, from the fact that each element of the surface 19 can be exposed individually. The performance of the device is therefore closely linked to the dimensions of the flat screen matrices employed and to the modes used for input to and output from the memory 13 of the device.

In the case of the first embodiment (FIGS. 3 and 4), images are input from the data input peripheral device to the random access memory 13 point by point while the addresses of these points are scanned through. On the other hand, they are output to the shift register in the controller 16 either in the same way as previously or in decreasing order of the weight of the binary information or bits where this weight corresponds to parameters of exposure intensity, duration, filtering or aperture that are uniform over the surface. The processor 5 thus outputs the most significant bits of all the points on the flat screen 18 first. Then, during subsequent scans of the flat screen 18, the less significant bits, in decreasing order. Each set of bits of the same weight corresponds to a uniform exposure intensity and it is the additive effect of these successive exposures which differentiate the localized exposure intensities. If only the exposure time is varied, for example, and a 1 state of the most significant bit corresponds to an exposure time of one thirtieth of a second, the bit with a weight of one half will correspond to an exposure time of one sixtieth of a second and so on, reducing by a factor of one half until the least significant bit is reached.

The time-delay generator 41 produces these time intervals.

The same effect of varying the illumination of points on the photosensitive surface 19 during the exposure can be achieved by progressively reducing the aperture or the transmission coefficient of the pixels of the screen by a half-value, the speed of each exposure and the filtering, that is to say the transmission coefficient of the flat screen, remaining fixed between the various part-exposures.

After choosing the exposure mode, the user chooses an imaging focusing mode.

He can focus the image manually by operating the focusing ring 40 of the objective lens 24.

He can see how operating this ring alters the sharpness in the viewfinder but may require enhancement of this visual information.

The device then computes and displays the image of the contrasts and the distances of the objects in the field of view. A spatial convolution determines local contrasts. It can be shown mathematically that the optimum focusing distance for an object in the field corresponds to an extreme value of local contrast: maximum for its contours and minimum for its surface. Now this optimum focusing distance is none other than the distance from the object to the center of the image capturing objective lens. For each point of the image the determination of the maximum contrast as a function of the focusing distance of the optical system provides the distance from the object point to which it is conjugate. For certain points on a uniform surface the variation in the contrast is not meaningful. In this case the distance of these points is given by angular comparison of the two images received by the sensors 3 and provided by the objective lens 24, which, because of the two-sided mirror 28, is equivalent to two half-objectives with parallel optical axes.

The convolution operation therefore supplies the distance of the contours of the objects and the angular comparison operation provides the distance of the surfaces of the objects.

The user can request automatic focusing by indicating or not on the tactile screen 15 the region that he wishes to see clearly. In this case the device executes the previously described function automatically, varying the focusing distance by means of the control system 44, and memorizes the distances calculated. Comparing them with the instructions given by the user or by an optimization program, the device chooses a distance.

The user may also want to increase or reduce the depth of field over certain regions of the image. The device then carries out the same operation as described in the previous paragraph but, during the exposure, it varies the focusing distance and opens the elements of the flat screen 18 at the time of (point required to be sharp) or after a controlled time shift from (point required to be more or less diffuse) the optimum focusing. By running through all the range of possible distance variation it is possible to obtain a depth of field ranging from the minimum focusing distance of the objective lens to infinity.

The user may require to vary the focal length during the exposure. If he gives this instruction and the parameters of this variation in focal length and of regions of the image corresponding to the various focal lengths, the processor 9 schedules transmission of the pixcels of the flat screen 18 during the exposure according to the focal length of the objective lens, which is slaved to it by the control system for the stepper motor 42.

The user may require to alter independently the aperture of the diaphragm 25 on the one hand and the depth of field and the contrast of the image on the other hand. The aperture corresponds to the mean transmittance of the objective lens, whereas the depth of field and the contrast correspond to the spatial distribution of the transmittances over the diaphragm screen 25. To vary the aperture of the diaphragm without modifying the other parameters mentioned hereinabove, the processor 9 commands multiplication by a spatially uniform coefficient of the transmittance of each pixcel of the diaphragm flat screen 25. To increase the depth of field only, the processor 9, without varying the average transmittance of the flat screen 25, commands uniformization of the transmittance of the pixels according to their initial transmittance. The depth of field is reduced by accentuating the differences between the transmittances of the pixels according to their initial transmittance. To increase the contrast only, the processor commands centrifugal displacement of the values of the transmittances of the pixels and reduction of the transmittances of the points nearest the optical axis without varying the average transmittance. On the other hand, to reduce the contrast the transmittance values of the pixels will vary by decreasing the distances of these values from the optical axis.

In order to select on a user instruction the spatial frequencies transmitted by the objective lens 25, the diaphragm flat screen 25 takes on the characteristics of a highpass filter (opaque wave or center of flat screen transparent) or a lowpass filter (transparent circle at the center of the opaque flat screen) or a bandpass filter (combination of the previous two forms, that is a transparent ring centered on the optical axis, the remainder of the flat screen 25 being opaque).

The distance between the flat screen 18 and the surface 19 to be exposed is varied by the stepper motor 30. Control of this distance conjointly with the aperture of the diaphragm 25 and in accordance with instructions given by the user makes it possible to adjust the diffuseness with which the flat screen is projected onto the film.

The captured image representation matrixes, especially those coded in value, of luminance and of chrominance and the matrixes obtained by calculation enable segmentation of the image into regions according to the characteristics thus emphasized.

After such segmentation the user can select at least one region thus defined by means of the display of the segmentation on the flat screen 17.

The writing of a text or a legend superimposed on the image recorded by the photosensitive surface 19 is achieved by means of the character generator function of the graphics screen controller 16. For this, writing or inlaying it is necessary to illuminate the flat screen on which the messages are written transparently by the light source 21.

The present device also makes it possible to superpose or inlay images by rendering transparent during successive exposures regions of the flat screen 18 determined by the user, and more generally to implement the functions of an editor by adding text, graphics or messages to the images by inlaying or superposition, for example.

The motor 51 for displacing and rotating the photosensitive surface 19 makes it possible to generate movement blur effects during the exposure. It also gives the device a means of changing the surface 19 between two exposures or of rewinding the surface 19 if this is rewindable. The motor 51 enables the film to be moved longitudinally and laterally in its plane.

The user is offered a video type electronic viewfinder, that is to say a viewfinder in which the image seen by the user is that captured by the sensor 3 and displayed with exposure parameters on the flat screen 20 placed in the viewfinder. Under low light conditions the light source 21 illuminates the flat screen 20.

Where a flash is used, the distance matrix may be employed to achieve a uniform exposure. The light falling on an object is inversely proportional to the square of the distance from the light source to the object at which reflection takes place. By filtering more heavily (that is to say, by transmitting less of) rays from objects at a short distance as compared with those resulting from reflection further away the effect of the flash is made uniform. Note that a function such as the contrast reduction function explained hereinabove adapted to an exposure comprising a number of successive flashes may be substituted for use of the distance matrix as explained in the previous paragraph.

The diaphragm consisting of the flat screen 25 replaces both a conventional diagram with a single circular aperture of variable diameter and known masks comprising a number of semi-transparent or transparent apertures. In this way the user can command any masking whatsoever of the image.

The device in accordance with the invention makes it possible to select and inscribe mask shapes on the tactile screen 15 manually.

The device in accordance with the invention makes it possible to carry out solarization by processing the luminance and chrominance histograms.

Also, by processing successively captured images it makes it possible to detect the speeds of all points of the image. Lateral and longitudinal movement of the film 19 at the measured average speed makes it possible to track movement of the camera or the object.

By controlling the flat screen 25, the device enables various image processing techniques explained in FIG. 9 in relation to the flat screen 73.

The device processes the images and also the parameters of the transfer function of the optical system and corrects the inherent defects of the optical system. This transfer function may be non-stationary in spatial and temporal terms.

FIGS. 6 through 8 show embodiments in which are implemented associations and combinations of elements described previously, in particular with reference to FIG. 2.

In FIG. 6 the optical sensor 3 is coincident with the surface 19 to be exposed. This embodiment is usable in image capture apparatus in which the surface 19 to be exposed generates a signal representative of the image.

In FIG. 7 the sensor 3 is coincident with the surface 19 and affects the flat screen 18. Reference may be had to U.S. Pat. No. 3,724,349 for a full description of how such an arrangement functions, described in outline hereinafter.

The photo-electro-optical transfer from the sensor 3 to the flat screen 18 is effected directly, point by point, by electrical influence or contact. The incident photons create electric charges fixed to the separation surface of the flat screen 18 and the sensor 19 and 3. The electromagnetic field generated by these charges or by the potential differences directly influences the state of the flat screen which is nearest it and consequently its transparency, point by point.

In accordance with the invention, the electrical power supply then serves to polarize the junction point by point and so to trigger the automatic functioning of each point. The device thus scans the points of the flat screen. This enables finer temporal control of each point of the surface 19 adapted to the functioning modes described hereinabove.

It is thus on a microscopic scale, within each point of the screen 18, that regulation of the luminous intensity is effected. To avoid uniformization through saturation of the screen state, a leakage current may be saved on the surface carrying the electric charges.

Alternatively, the frosted glass 10 forms an integral part of the flat screen 20.

Alternatively, at least one sensor 3 is placed behind a partially transparent sensitive surface to receive the image.

The flat screens 25, 18, 20 and 17 may alternatively be arranged as a network having rotational symmetry for advantagous adaptation to the rotational symmetry of the objective lens 24.

Alternatively, the objective lens 24 may be interchangable and, in this case, is not slaved to the device. A lens is then added in the camera body of a sort to enable adjustments of the focal length and focusing distance needed by the device.

This lens is shown in FIG. 11. In this embodiment it is placed behind the objective lens and in front of the two-sided mirror 28 and it is moved along the optical axis by the stepper motor 44 which serves to adjust the focusing. The iris type diaphragm 25 is generally coupled to the camera body by a bayonet fixing between the camera body B and the objective lens 24. In this case the motor 42 is not provided.

Alternatively, the device may function in coherent light by employing a known type Pockels effect device.

Alternatively the use of a dioptric deviator as described later (FIG. 9) the deviation of which is slaved to the device may be substituted for the functions of the motor 51 except for that of rotating the surface 19.

Alternatively, the mirror 28 may be removable, the image processing being applied to the last image captured.

Alternatively, the video viewfinder may utilize the flat screen 17.

Alternatively, the sensor 3 perceives an image having a parallax error. This error is corrected using the distance matrix.

Alternatively, two sensors perceive images to either side of the objective lens and segmentation in accordance with the luminous characteristics of the objects makes it possible to reconstitute the original image.

Alternatively, a light source slaved to the device and means for combining its radiation with that from the objects makes it possible to increase illumination during the exposure. A flat screen serving as a polychrome filter reproducing the captured image thus makes it possible to multiply the illumination without modifying the shapes of the luminance and chrominance histograms.

Alternatively, the luminous exposure may be done by means of a slit, the components of the device being adapted to this specific application.

Alternatively, distances may be measured by sending-/receiving a signal or by angular comparison of objects from which the radiation has a specific spectral component analyzed by diffraction.

In FIG. 8, the objective lens 2 which forms an integral part of the device forms an image on the matrix optical sensor 3. Two flat screens 18 are placed in front of eyes 19 of a user.

The device obscures only those areas where the luminous intensity directed towards the pupil of the user would risk dazzling him, leaving the other areas perfectly transparent.

This embodiment, which constitutes a pair of protective goggles, is used to protect the eyes of certain workers, such as welders, and to avoid night dazzle, for example.

By way of operating mode, the device measures the distance of dazzling objects and corrects the parallax error in a way that is necessary for correct positioning of opaque regions on the straight line from the dazzling object to the pupil.

Alternatively, a pupil position detector may be added for exact positioning of the regions of the flat screen 180 with lower transmission on the optical path of the dazzling rays.

Other operating modes and variants will emerge from the embodiments described hereinafter.

FIG. 9 shows another application of the invention to a device that can be fitted to an optical system such as an objective lens, for example of a camera, telescope, microscope, etc.

This embodiment may therefore form an integral part of image capture apparatus or of an objective lens or may be independent of but connectable thereto, by means of adapter rings, for example. FIG. 9 shows an association of this kind by way of non-limiting example. For reasons of simplification, FIG. 9 does not show any electrical or electromechanical components. These components are in any event analogous to those already described in relation to the FIG. 3, 4 and 5 embodiment.

The objective lens 24 shown here is known as the Von Rohr "BIOTAR", and its qualities are well-known; it focuses the image on the rear surface of its last lens 80, which is a Smyth type lens.

The device comprises successive flat screens 72, 74 and 54 in front of the objective lens 24 on the optical axis A. There is a photo-sensitive sensor 3A on an axis parallel to the optical axis A behind part of the flat screen 72. A known type adapter ring 33 connects it to the objective lens 24.

To the rear of the objective lens 24 is connected by a known type adapter ring 35, of the bayonet type, for example, a second part of the device comprising in succession on the optical axis a flat screen 18, a sensor 3B, a deviator D1, a lens 34A, an inclined semi-reflecting mirror 29 which reflects some of the light rays towards the sensor 3C, a flat screen 73, a lens 34B and a deviator D2. The flat screen 18 backing the sensor 3B and the deviators D1 and D2 are respectively connected to the stepper motors 30, 81, 81′ slaved to the control processor 9 by a parallel interface circuit 23 and by control circuits 43. Finally, an adapter ring 36 connects the second part of the device to a known optical system (not shown) such as a camera, for example. The flat screens 74, 54, 18 and 73 and the sensors 3A and 3C are of the same type as those described with reference to FIG. 3.

The flat screen 72 comprises a liquid crystal enclosed between two glass plates which carry transparent electrodes. It is novel as compared with conventional flat screens with polarizers in that it has only one polarizer on the back.

The sensor 3B is of the known amorphous structure type as described in U.S. Pat. No. 3,724,349 and additionally has a network of parallel transparent electrodes of known shape for liquid crystal screens.

The group of lenses 34A, 34B comprises two lenses of the same focal length in a so-called 4F assembly. The rear focal plane of the lens 34A and the front focal plane of the lens 34B are coincident.

The flat screen 54 is situated in a diaphragm plane of the objective lens 24.

In the position as shown in FIG. 9, the flat screen 18 is generally in the focusing plane of the objective lens 24, being displaced along the optical axis A only to implement specific functions.

The flat screen 18 is in the front focal plane of the lens 34A.

The flat screen 73 is in the common focal plane of the lenses 34A and 34B.

The sensor 34 backs the flat screen 18.

The surface to be exposed is situated in the rear focal plane of the lens 34B.

The deviators D1, D2 are of the known type with two planospherical lenses on one side of which the radii of curvature are equal, the rear lenses of D1 and the front lenses of D2 being planoconvex and the rear lenses of D2 and the front lenses of D1 being planoconcave, the spherical surfaces being in continuous contact over part of their surface area.

The deviators D1 and D2 are symmetrical relative to the center of symmetry of the 4F assembly which is the common focus of the lenses 34A and 34B.

The axes of the front lenses of D2 and the rear lenses of D1 are controlled by the processor 9 through electromechanical control means 81 of the aforementioned type (FIG. 3).

The function of the part of the device in FIG. 9 in front of the objective lens 24 is to process the light rays before they enter the optical system consisting of the objective lens 24 whereas the part of the device situated behind the objective lens is dedicated to processing the transfer function of the image processing system and the spatial Fourier transform of the image.

In the first part of the device situated in front of the objective lens 24 three flat screens 72, 74 and 54 process the incident light rays in turn.

The function of the flat screen 72 is to polarize the light with a specific axis. The activation of an element (pixel) of the liquid crystal makes it possible to rotate the polarization axes of the incident light in such a way that the selected polarization axis corresponds, after such rotation, to the axis of the rear polarizer and so that the light polarized according to the selected axis passes through the flat screen. Also, the flat screen 72 comprises two homothetic regions the states of which are also homothetic, the first region being in the field of the objective lens 24 and the second in the field of a sensor 3A.

The function of the flat screen 74 is to apply chromatic filtering to the image, point by point or region by region. It is a flat screen operating in color.

The flat screen 54 serves as a variable geometry mask. It is placed on a diaphragm plane of the optical system. It can serve as a centered, eccentric or multi-aperture diaphragm or as a mask of any shape. The pixels of the flat screen 54 do not have any chromatic action and are operative only on the transmission factor.

The second part of the device, situated behind the objective lens 24, uses the keyboard 11 and tactile screen 15 shown in FIG. 5.

Its optical components are as follows: a flat screen 73, two deviators D1 and D2, a flat screen 18 and a group of lenses 34A, 34B placed behind the flat screen 18.

The function of the flat screen 18 is to scan the points of the image focused onto it by the Smyth lens 80 in sequence. It therefore serves to separate the rays passing through the device spatially and temporally in order to process them separately.

The flat screen 18 also implements all of the functions shown in FIG. 3.

The flat screen 73 is placed in the plane of the spatial Fourier transform of the focused image at 18. The 4F or double-diffraction combination of the lenses 34A, 34B gives the spatial Fourier transform of the focused image at 18 in the common focal plane of these lenses while conjugating the two other focal planes.

The flat screens 54 and 73 may implement all of the functions of the flat screen 25 (FIG. 3). The objective lens 24 having an infinite focusing distance, the displaying on the flat screen 54 of a pattern and the analysis of its image captured by a sensor 3B or 3C makes it possible to measure optical defects generated by the objective lens 24. The flat screen 54 is then conjugate with the sensor 3C and its Fourier transform is found on the sensor 3B on the focusing plane of the objective lens.

The lens 34B serves to form on a surface 19 the image resulting from the superimposition of the original image and the filtered image resulting from its passage through the elements described hereinabove.

Note that other arrangements without lens or with object or image situated in a front plane of at least one lens also provide the Fourier transform of the object.

The mechanical system 30 serves to move the flat screen 18 and the sensor 3B longitudinally along the optical axis of the device. The longitudinal displacement effected through the intermediary of the mechanical systems 30 makes it possible to obtain a diffuse image on the surface 19 of the contours of the pixels of the flat screen 18.

There are shown in FIG. 9, in addition to the elements cited in the previous paragraph, three matrix optical sensors 3A, 3B, 3C. The image of the spatial Fourier transform of the initial image is formed on the matrix sensor 3C by reflection from a plate 28.

The optical sensor 3A receives an image transmitted after polarization by the flat screen 72. The optical sensor 3B is an amorphous sensor and is in contact with the flat screen 18, which it influences directly, point by point. The sensor 3C is of the type described with reference to FIG. 3.

The light ray deviator D1 using spherical lenses makes it possible to deviate the rays towards the optical axis of the device for better processing. The second deviator D2, symmetrically disposed to the first in the symmetrical 4F assembly, makes it possible to scan the surface 19 symmetrically to the scanning of the flat screen 18 by the deviator D1, by virtue of the central symmetry of the 4F assembly. This function is implemented by slaving the deviator to the device in accordance with the invention by means of electromechanical means 81 of the same type as those already described.

The adapter rings 33, 35 and 36 may be part of or independent of the device. They enable each part of the device to be coupled to the objective lens 24 and possibly to some other optical system.

The first part of the device functions according to the instructions input by the user on the keyboard (not shown).

The first part of the device includes all the components necessary to effecting all filtering, marking and polarization processes currently carried out by known type filters, of the "COKIN" brand, for example.

The operating mode corresponding to the implementation of such filters and masks by the first part of the device is not described in detail here, being known in itself.

The functioning of the first part as a contrast enhancer is as previously described, by variation of the transmission factor of each region of the flat screen 74 according to the light received by the corresponding region of the sensor 3A.

The polarization axis of the incident light carrying maximum illumination is detected by measuring the light received by the sensor 3A according to an angle of rotation about the optical axis A of the polarization axis selected by the flat screen 72.

Generally speaking, light from the sky is for the most part polarized relative to one axis, whereas that resulting from reflections of this light from objects has different major polarization axes. This function of the first part of the device makes it possible to process these polarization axes separately.

For example, if the flat screens 72, 74, and 54 and the sensor 3A have only two regions, the first part of the device constitutes a bichromic filter each half of which can be modified instantaneously in terms of intensity, color and polarization. This part of the device may be used independently, for example with mirror type objective lenses which do not have any diaphragm, or in projectors to correct the chromatic effect of aging of chemical media.

The functioning of the second part of the device is described hereinafter.

A specific function referred to as the contour function is generated as a result of the influence of the sensor 3B on the flat screen 18. The potential difference between two neighbouring elements of the surface of the sensor 3B modifies the state of the flat screen element facing their common frontier and thus accentuates or reduces the contours of the image formed on the flat screen 18.

The general function of the second part of the device is to process the spatial Fourier transform of the image passing through the flat screen 18 situated in the plane of the Fourier hologram; for example, the flat screen 73 can take the form of a highpass filter, that is to say transparent around an opaque central circle, a lowpass filter, that is to say opaque around a tranparent central circle, or a bandpass filter, a combination of the previous two states.

Successive scanning of the points of the flat screen 18 by successive opening of the corresponding points in correlation with the state of the frequency filter centered on the corresponding point of the flat screen 73 results in processing of the image region by region. This scanning is effected in correlation with the scanning of the flat screen 18 as effected by the axis of the deviator D1 to enable improved processing.

A specific function of this second part of the device is image restoration. The images captured often suffer from defects in the form of blur due to movement or lack of sharpness due to focusing errors or noise. The analysis and processing of the spatial Fourier transform of the image or of its elements taken separately makes it possible to correct for such noise, focusing errors or movement blur. A simple analysis and correction of the Fourier transform is sufficient to alleviate each of these defects.

The image processing techniques applied to the Fourier hologram are known and comprise, for example, matched filters, Foucault edges, phase filters, Foucault-Hilbert filters, differentiator filters, integrator filters, screening functions, contrast enhancement, multiplexing, blur-elimination, recognition of shapes by optical correlation, non-destructive testing, spreading, filtering, coding, image compression and convolutions, correlation and autocorrelation. Useful reference may be had to "Optical Information Processing" published by John Wiley & Sons and "Traitement optique du signal et des images" published by Cepadues Editions.

The advantage of image processing by the device results from the fact that this processing may be effected automatically and in a way adapted to the image transmitted.

In particular, a signal transmitted to the flat screen 73 may be calculated from the Fourier transform of the image to permit autocorrelation and rotation of the transmitted image, the signal transmitted corresponding to a translation of the Fourier transform.

The respective positions of the flat screen 18 and the matrix optical sensor 3B on the optical path of the light rays may be different. The flat screen 18 may be in front of or behind the sensor 3B. In the second case (FIG. 9) the sensor receives the image resulting from filtering due to the state of the flat screen 18 and the influence of 3B on 18 is effected by way of a control loop. Likewise, the respective positions of the screens 73 and 72, 74 and 54 relative to the sensors 3C, 3A may be interchanged.

The use of a rotation effected by correlation on the flat screen 73 and the deviators D1, D2 makes it possible to generate movements of the image of all kinds and in particular to implement the functions of the motor 51 (FIG. 3).

The functions of the application of the device to image capture apparatus (FIG. 3) are all possible with the application described here, the flat screen 18 having a position analogous to that previously described (FIG. 3) and the flat screens 54 and/or 73 having positions analogous to that of the flat screen 25 (FIG. 3).

Alternatively, the adapter rings 33, 35 and 36 transmit coded information in electrical, mechanical or some other form, for example.

Alternatively, the sensor 3B is distributed between the nodes of the network of the flat screen 18 in the form of phototransistors, photodiodes or transistors functioning by photo-electric effect.

Alternatively, two sensors 3B may be placed in succession on the optical axis A, comparison of the respective images captured providing an object distance matrix.

Alternatively, the sensors 3A, B, C may be outside the usable field of the optical device, for example in front of the continuously opaque parts of the diaphragm.

Alternatively, the flat screen 73 is of the active type so as to modify the Fourrier transform of the image by adding clear pixels to it or to increase the luminance without modifying the chrominance.

Alternatively, all the components placed on the optical path of the light rays, including the flat screens, may be retractable by mechanical or electromechanical devices.

Alternatively, these mechanical or electromechanical devices or systems may control the longitudinal position of the various flat screens along the optical axis of the device.

Alternatively, the sensor 3A may advantageously be provided with means for detecting the horizon by processing the histograms of at least two perpendicular lines of photo-sensitive elements so as to define two separate processing areas, one for the sky and one for the ground, for example. Other known type horizon detector means can implement an analogous function.

Other operating modes and variants will emerge from the embodiments described hereinafter.

FIG. 10 shows an application of the invention to an image restoration system or in a projection apparatus. To make the figure clearer most of the mechanical, electromechanical and electronic components have been omitted, and are in any event analogous to those previously described. Similarly, conventional optical components of slide projectors such as, for example, a frosted glass, a heat filter, a mirror and a condenser lens are grouped together within the term "light source".

This application comprises the following optical elements placed on conjugate optical axes A, A1, A2, A': a light source S, a polarizing semi-reflecting splitter mirror 28A, two slides 39, two flat screens 18, two polarizing semi-reflecting mirrors 28C and 28B, a semi-reflecting combiner mirror 28D, a flat screen 72 of the same type as the flat screen 73 previously described (FIG. 9), the polarizer of this flat screen being behind the liquid crystal, and an objective lens 24. The mirrors 28A, B, C, D are inclined so that an incident ray on the optical axis A is reflected at right angles to that optical axis. The optical axes A, A1, A2, A' are made conjugate by the mirrors 28B, A, C, D, respectively. The focal length and the focusing distance of the objective lens are respectively controlled by stepper motors 42 and 44. Sensors 3A, 3B and 3C are placed on the optical axis A1, A' and A'2, a lens 2 forming on the sensor 3A an image of the object consisting of the slides 39 as transmitted by the flat screens 18. The number of flat screens 18 is not limited and corresponds to the number of views to be restored simultaneously. Two of these views have been schematically represented here. In the remainder of this description the term projector will be used to refer to projectors and image restoration apparatus.

The function of an image mixer is to mix images in such a way that they are projected by the same objective lens onto the same area of the surface to be illuminated.

The image mixer in this embodiment comprises four mirrors 28 A, B, C, D which are polarizing semi-reflecting, parallel, plane mirrors such as non-return mirrors; such mirrors have the property of allowing light rays with one polarization axis to pass through them and reflecting light rays with a polarization axis perpendicular to the former axis. The two images or views 39 to be projected simultaneously have perpendicular polarizations and are separated point by point by a polarizer flat screen 72 placed behind the objective lens 24 (not shown) or before the eyes of a spectator (not shown) or in front of the objective lens 24 (FIG. 11).

The sensor 3A receives the image of the transmittances 39 and the flat screens 18 before they leave the projector, being made conjugate with them by the lens 2.

The sensor 3B receives the image returned from the screen 19, with which it is made conjugate by the objective lens 24.

The sensor 3C receives the image returned from the screen 19 after a second passage through the transmittances 39.

The reflection polarization axes of the mirrors 28 A, B, C, D are oriented in such a way that the majority of the rays from the source S arrive at the flat screen 72 when the flat screens 18 are inoperative.

However, the mirrors 28 A, B, C, D have reflection polarization axes that are slightly offset so that some of the light rays which pass through them are directed towards the sensors 3A, 3B, 3C.

The sensors 3B and 3C provide for automated focusing by means of an appropriate optimization program. It can be shown mathematically that the maximum overall illumination perceived by the sensor 3C corresponds to the optical conjugation of the objects 39 with the projection screen.

A focusing control device 44 and a focal length control device 42 are connected to the device.

This mode of functioning, which is not shared by the other embodiments of the device, has the advantage of not requiring the light source S to be turned off while changing views or during sequential dissolves. Also, new spatial sequential dissolves can be generated by obscuring regions of a flat screen associated with one image while the corresponding regions are open on the other flat screen. Polarization of the light created by the mixer is used for 3D vision, the slides 39 then having been made by a stereoscopic device.

In an alternative mode of functioning the flat screens 18 may carry a pattern of which an image is perceived by a sensor 3 and then analyzed in such a way that the optical defects of the optical system are memorized by the device. During the transfer of an image the flat screens 18 assume a state that corrects some of these defects, in particular for uniform illumination of the surface 19.

Other modes of functioning shared with the embodiments previously described will not be described again here. Note, however, that the flat screens 18 could procure the same functions as previously and that the flat screen 72 could make provision for the same functions as the flat screens 25 (FIG. 3) and 74, 54, 73 (FIG. 9).

Alternatively, the keyboard 11 includes an input for coded messages on the sound tape that usually controls slide projectors.

Alternatively, the source S may be a laser associated with a lens or not. In this case the objective lens 24 may be eliminated.

Alternatively, the image mixer may consist of a known type prism.

Alternatively, it is possible to produce a flat screen made up of a plurality of mixers using polarizing semi-reflecting mirrors to decompose the images pixel by pixel according to the polarization axes and then to mix them.

FIG. 11 shows a lens 71 backing a flat screen 71 and a plate 69 with variable optical path. The lens 71 is such that each radius r varying between 0 and R defines a circle on the convex disk of the lens 71 centered on the optical axis, the focal length depending on r, which is not the case with ordinary lenses.

The plate 69 is of the piezoelectric crystal type, for example, and is a known type of component whose index varies according to stresses applied to it.

Using the flat screen 70 to select the circle of radius r, the device selects a focal distance of the lens. By modulating the optical path of the rays that pass through it in accordance with the value of r, the plate 69 makes it possible to move the focusing point without modifying the focal length. Thus it is not necessary to move the lens 71 to achieve focusing.

Alternatively, the lens 71 may be a Fresnel lens. In this case the plate 69 has a constant optical path in line with each element of the Fresnel lens and with a value such that the focusing points are coincident.

Alternatively, the lens 71 may be replaced by a mirror having the same properties of variable focal length according to the distance to the optical axis, or any analogous device.

Likewise, it is possible by using plates in which the index is variable overall of the same type as the plate 69 constituting the flat screens to obtain an association of plates which, depending on the indexes, is either reflective (mirror) or transmissive, producing constructive or destructive interference.

Note that each of the flat screens described in relation to the previous embodiments can be replaced by any of the other flat screens and in particular may be of the active type.

In particular, the device shown in FIG. 11, or variations thereof, may be adapted to the three embodiments of the invention. The same goes for the image mixer (FIG. 10) and the mixer flat screen.

When a view taken by a device of the first embodiment and with the contrast reduced is projected by a device such as that described with reference to FIG. 10 with its contrast increased, then a compander type function is obtained in respect of the contrast.

A function common to the three embodiments is, of course, the coloring of monochrome images.

Alternatively, the use of plane dioptric elements in front of the objective lens makes it possible to transfer the image of a pattern using known modes.

Initial tests make it possible to memorize for the three embodiments the defects inherent to the optical system and to correct them systematically.

Of course, the flat screens may be positioned on all the specific planes of the optical system such as, for example, the nodal, antinodal, principal, antiprincipal, field diaphragm, aperture diaphragm, etc planes so as to exploit the specific properties of these planes.

Also, the flat screens as described hereinabove may receive on a support (or coding) that is not luminous but physical and in particular electrical a video type image received, analyzed and modified by the device to obtain, for example, a television with automatic correction of optical defects or a mask serving to generate integrated circuits.

Note that if a transmissive flat screen is placed in front of a hologram storage medium the same modifications may then be applied to the hologram as to any image.

Note that any combination of the components and/or the functions of the applications described lie within the scope of the invention.

I claim:

1. An image processing device of scene light from an object, comprising an image sensor and a flat image transfer screen both arranged to receive scene light from the same object, an image receiving surface placed optically downstream of the flat transfer screen, said image sensor comprising a first network of image points or pixels, said image sensor being adapted to generate for each of the pixels of the first network a signal representative of an optical parameter of the scene light, said first network being connected to a processing means and for delivering thereto said representative signals, said flat screen comprising a second network of image point or pixels, said processing means generating state control signals as a function of said representative signals, memory means connected to said processing means for storing the state control signals generated by said processing means, said processing means also being connected to said second network for transferring said state control signals from said memory to corresponding ones of said pixels of said second flat screen, and said flat screen defining means for modulating the scene light for optical transfer to said receiving surface.

2. A device according to claim 1, wherein said flat screen and said receiving surface are both being located proximate to a focusing plane of said device.

3. A device according to claim 2, further comprising an objective lens, said flat screen being located in a diaphragm plane of said objective lens.

4. A device according to claim 1, wherein said flat screen is located proximate to a focusing plane of said device, and further comprising an objective lens, another flat screen being disposed in a diaphragm plane of said objective lens.

5. A device according to claim 1, wherein there are a plurality of said flat screens, one of said flat screens being located proximate to a focusing plane of the device.

6. A device according to claim 1, wherein one of the optical parameters of the scene light is a uniform transfer function parameter, said flat screen being located proximate to a diaphragm plane of said device and comprising means varying said uniform transfer parameter.

7. A device according to claim 1, wherein there is a plurality of said flat screens, one of said flat screens being placed proximate to a plane where a Fourier transform of the image is formed so as to vary a parameter of said transform.

8. A device according to claim 1, wherein said device forms part of an image receiving and recording apparatus (B), said recording surface comprising a photosensitive surface.

9. An apparatus according to claim 8, further comprising a viewfinder with a frosted glass element, there being a plurality of said flat screens, one of said flat screens being located proximate to said frosted glass element.

10. An apparatus according to claim 8, further comprising a flash accessory, and means for displaying a distance matrix on said on flat screen when it is used with said flash accessory.

11. A device according to claim 1, wherein a plurality of said flat transfer screens is provided, one of said flat screens having means for varying a polarization axis of said transmitted light, pixel by pixel.

12. A device according to claim 1, further comprising a pattern transfer means in combination with means for analyzing and correcting an image of said pattern, said pattern transfer means comprising another said flat transfer screen.

13. A device according to claim 1, wherein each of said pixels of said flat screen is associated with a photo-connecting element connected to receive said state control signals.

14. A device according to claim 1, further comprising means for converting signals generated by said image sensor into digital signals.

15. A device according to claim 1, wherein said processing means includes a micro-processor.

16. A device according to claim 1, wherein said memory forms parts of flat screen circuitry.

17. A device according to claim 2, wherein each of said pixels of said second network optically corresponds to at least one of the pixels of said first network and receiving light from the same part of the object as the at least one pixel of said first network, the state control signal for each of the pixels of the second network being a function of the representative signal of the at least one pixel of said first network.

18. A device according to claim 6, wherein said flat screen located in said diaphragm plane having an opaque central area and a partially transparent outer annular ring.

19. A device according to claim 18, wherein said uniform transfer function is depth of field, said parameter being a function of the radial dimension of said outer annular ring.

20. A device according to claim 18, wherein said uniform transfer function is aperture diameter, the parameter being a function of the average transmittance of said annular ring.

21. A device according to claim 18, wherein said uniform transfer parameter is sharpness, the parameter being a function of diameter of the opaque central area.

22. A device according to claim 2, further comprising an objective lens, another said flat screen being located in a diaphragm plane of said objective lens.

23. A device according to claim 1, wherein the optical parameter is light intensity, the state control signal being a decreasing function of the representative signal of the at least one pixel of the first network and the resulting modulated light having a lower contrast than the scene light of the object.

24. An image processing device of scene light from an object, comprising an image sensor and a flat image transfer screen both arranged to receive scene light from the same object, an image receiving surface placed optically downstream of the flat transfer screen, said image sensor comprising a first network of image points for pixels, said image sensor being adapted to generate for each of the pixels of the first network a signal representative of an optical parameter of the scene light, said first network being connected to a processing means and for delivering thereto said representative signals, said flat screen comprising a second network of image points or pixels, said processing means generating state control signals as a function of said representative signals, memory means connected to said processing means for storing the state control signals generated by said processing means, said processing means also being connected to said second network for transferring said state control signals from said memory to corresponding ones of said pixels of said second flat screen, and said flat screen modulating the scene light transferred thereby, for optical transfer on said receiving surface, said flat screen and said receiving surface both being located proximate to a focusing plane of said device, each of said pixels of said second network optically corresponding to at least one of the pixels said first network and receiving light form the same part of the object as the at least one pixel of said first network, the state control signal for each of the pixels of the second network being a function of the representative signal of the at least one pixel of said first network, the optical parameter being light intensity, the state control signal being a decreasing function of the representative signal of the at least one pixel of the first network and the resulting modulated light having a lower contrast than the scene light of the object.

* * * * *